US010620144B2

(12) United States Patent
Gutierrez

(10) Patent No.: US 10,620,144 B2
(45) Date of Patent: Apr. 14, 2020

(54) IMPEDANCE-BASED MEASUREMENT OF EYE-MOUNTABLE LENS HYDRATION

(71) Applicant: Verily Life Sciences LLC, Mountain View, CA (US)

(72) Inventor: Christian Gutierrez, San Francisco, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 81 days.

(21) Appl. No.: 15/889,987

(22) Filed: Feb. 6, 2018

(65) Prior Publication Data

US 2018/0246049 A1 Aug. 30, 2018

Related U.S. Application Data

(60) Provisional application No. 62/464,018, filed on Feb. 27, 2017.

(51) Int. Cl.
*G01N 27/04* (2006.01)
*G01N 27/02* (2006.01)
(Continued)

(52) U.S. Cl.
CPC ........ *G01N 27/048* (2013.01); *G01N 27/026* (2013.01); *G01N 27/041* (2013.01); *G02C 7/04* (2013.01); *G02C 11/10* (2013.01)

(58) Field of Classification Search
CPC ........ G02C 11/10; G02C 7/04; G01N 27/048; G01N 27/041; G01N 27/026
(Continued)

(56) References Cited

U.S. PATENT DOCUMENTS 8,989,834 B2 3/2015 Ho et al.
2011/0184271 A1 7/2011 Veciana et al.
(Continued)

FOREIGN PATENT DOCUMENTS

WO 2016150630 A1 9/2016

OTHER PUBLICATIONS

Invitation to Pay Additional Fees and Provisional Opinion Accompanying the Partial Search Report from the International Searching Authority dated Feb. 2, 2018, for International Application No. PCT/US2018/019230, filed May 30, 2018, 15 pages.
(Continued)

*Primary Examiner* — Tuyen Tra
(74) *Attorney, Agent, or Firm* — Christensen O'Connor Johnson Kindness PLLC

(57) ABSTRACT

An example ophthalmic device for impedance-based measurements of hydration of the ophthalmic device includes an enclosure having a shape to be worn on an eye, an insert disposed within the enclosure control electronics disposed on the insert, the control electronics coupled to control operation of the ophthalmic device, and a plurality of electrodes disposed within the enclosure and electrically coupled to the control electronics, where the plurality of electrodes are arranged outside of a central optical area of the ophthalmic device, and where each of the plurality of electrodes is electrically coupled to receive a respective voltage from the control electronics to measure an impedance of the enclosure proximate the plurality of electrodes, the measured impedance indicative of a hydration level of the enclosure proximate to the plurality of electrodes.

29 Claims, 3 Drawing Sheets

(51) Int. Cl.
*G02C 7/04* (2006.01)
*G02C 11/00* (2006.01)

(58) Field of Classification Search
USPC .............................. 351/41, 159.01, 159.02
See application file for complete search history.

(56) References Cited

U.S. PATENT DOCUMENTS

| | | |
|---|---|---|
| 2012/0245444 A1 | 9/2012 | Otis et al. |
| 2014/0085602 A1 | 3/2014 | Ho et al. |
| 2014/0343387 A1 | 11/2014 | Pugh et al. |
| 2014/0379054 A1 | 12/2014 | Cooper et al. |

OTHER PUBLICATIONS

Gu, Jingren et al., "A 10uA On-chip Electrochemical Impedance Spectroscopy System for Wearables/Implantables", IEEE Asian Solid-State Circuits Conference, Nov. 10-12, 2014, 4 pages.
International Search Report and Written Opinion from the International Searching Authority dated Jul. 23, 2018, for International Application No. PCT/US2018/019239, filed Feb. 22, 2018, 21pages.

IMPEDANCE-BASED MEASUREMENT OF EYE-MOUNTABLE LENS HYDRATION

CROSS-REFERENCE TO RELATED APPLICATIONS

This application claims the benefit of U.S. Provisional Application No. 62/464,018, filed Feb. 27, 2017, which is incorporated by reference in its entirety.

TECHNICAL FIELD

This disclosure relates generally to ophthalmic devices, and in particular but not exclusively, relates to Ophthalmic devices that monitor device hydration.

BACKGROUND INFORMATION

Contact lenses are worn by a large number of people throughout the world, mainly for the purpose of vision correction. However, as advancements in lens technology continue to progress, more people may be inclined to wear lenses. For example, advanced lenses, which may be termed "smart lenses," may provide medical and advanced vision correcting features. Although contact lenses have been around for some time, a large portion of the lens wearing population may experience dryness of the eye due in part to the lenses. While various contact lens technologies have been developed over the years to combat dryness, the problem persists. Measurement of lens hydration levels may therefore be desirable, particularly when paired with innovations in lens design to assess, monitor and ultimately improve comfort and moisture retaining performance.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
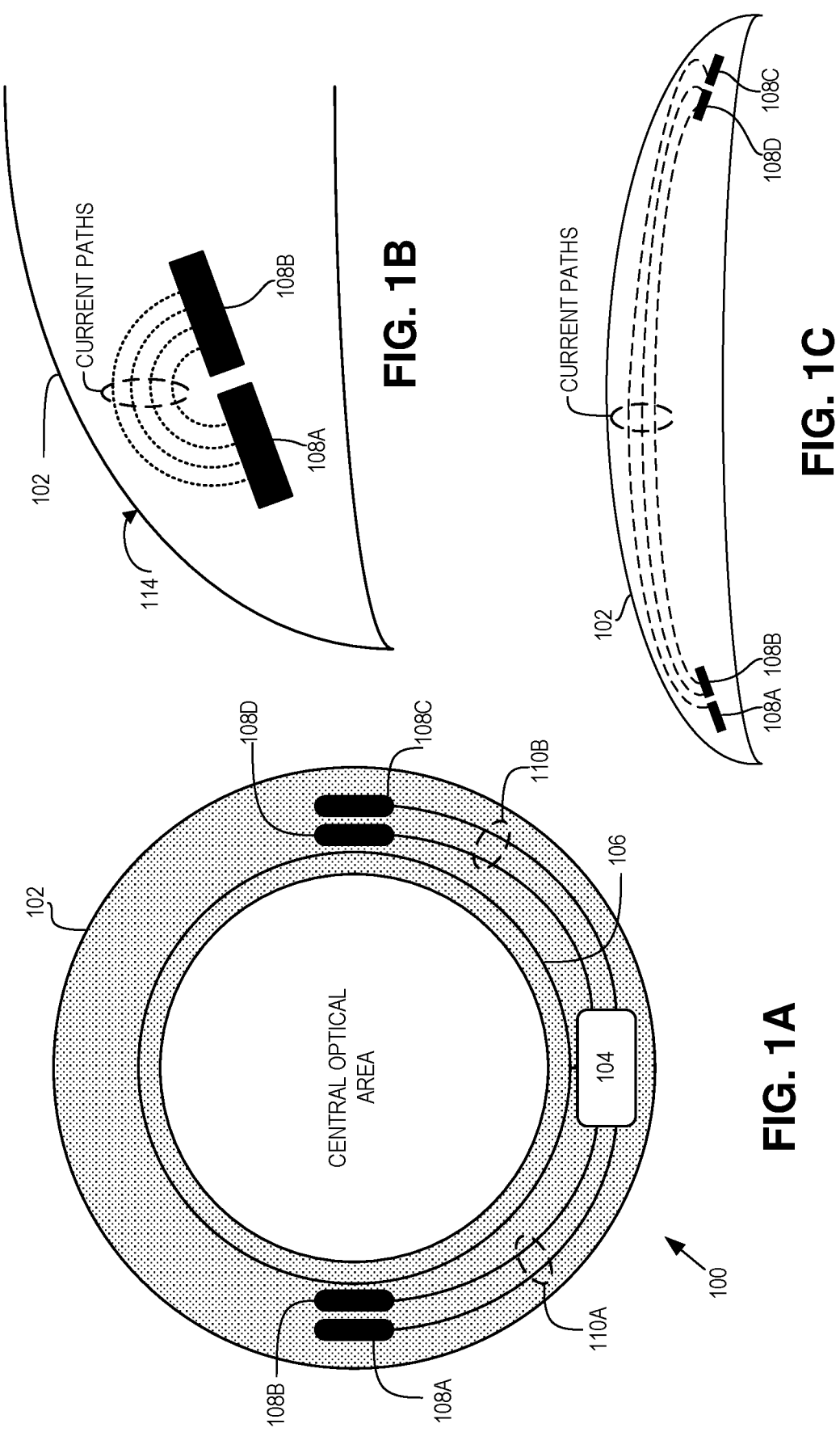
FIG. 1A is a plan view of an ophthalmic device 100 in accordance with an embodiment of the disclosure.
FIG. 1B is a cross-sectional view of a portion of the ophthalmic device 100 in accordance with an embodiment of the disclosure.
FIG. 1C is a cross-sectional view of the ophthalmic device 100 in accordance with an embodiment of the disclosure.

Embodiments of a system and method for impedance-based measurements of eye-mountable lens hydration are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A majority of contact lens wearers have symptoms of ocular irritation, with "dryness" being the most commonly-reported symptom. In the United States, there are approximately 35 million contact lens wearers, which suggests that as many as 17 million contact lens wearers experience significant dry eye symptoms. Dryness generally means the absence of "natural or normal moisture" which a lens wearer experiences as an uncomfortable sensation. The primary reasons for contact lens intolerance and discontinuation are discomfort and dryness. Clinically, dry eye and alterations of the tear film in contact lens wearers are associated with reductions in functional visual acuity, reductions in wearing time, and an increased risk of ocular surface dehydration, bacterial binding, and infection. Taken together these factors clearly indicate the impact and importance of contact lens hydration in both normal and dry-eye affected wearers.

Subjective measures of lens comfort may typically be the only methods to assess wearability and comfort, which are highly dependent on contact lens hydration. Other methods include optical coherence tomography (OCT) and optical absorption techniques, however no methods currently exist for quantitative measurements of hydration on-board a contact lens in-situ (i.e., while being worn).

One of the most elusive material characteristics potentially associated with dryness symptoms has been initial (or nominal) water content of a lens. All hydrogel-based lenses have the potential to lose water when taken from a vial or blister pack. Generally, low water content lenses may lose about 1% of water content, high water content lenses may lose about 5%, but no lenses have ever been shown to completely dehydrate during lens wear (dehydration levels are at most around 15%). It is also known that while dehydration may continue over the course of a full day's wear (e.g., 8 hrs.), a significant portion of this dehydration may occur within the initial 5-25 minutes of wear time. Therefore, subtle changes to dehydration rates over several hours after the initial wear time are of interest to overall comfort and eye health.

Additionally, the mechanism of greater water loss in higher water content lenses is not fully understood. Some suggest that the difference in dehydration rates between low and high water content lenses may be related to the ratio of free-to-bound water associated with the polymer. It is important to note that regardless of the mechanism of contact lens dehydration, the number of contact lens wearers continues to grow, and it is likely that the prevalence of contact lens-related dry eye syndrome will increase, as there have been no significant advances made to reduce the dry eye problem in lens wearers.

In the context of smart contact lens technologies, the ability to monitor lens hydration in-vivo becomes increasingly important as sensing applications, heterogenous materials, and hybrid lens designs increase the complexity of assessing lens viability. Current approaches cannot measure lens hydration locally over regions of the lens and measurements must be performed in very controlled environments. Smart contact lenses with the ability to assess and communicate hydration levels offer the possibility of providing quantitative measures of lens comfort as well as alert when recommended hydration limits are reached in order to preserve long term eye health. Additionally, monitoring local hydration levels becomes increasingly important for sensing applications which are particularly sensitive to the local sensor environment such as glucose sensing. In order to augment and optimize smart contact lens technologies, the use of accompanying sensors will provide the ability for smart lenses to self-monitor and communicate lens hydration state. Novel methods of in-situ contact lens hydration sensing are desirable.

It is known that conductivity within the lens increases with decreasing hydration. This is primarily driven by evaporation from the lens surface which removes water, leaving behind an increasingly ion-rich environment. With each blink the lens might be rehydrated to some extent; however, the rehydration does not replace the water lost in the first 60 to 120 minutes of lens wear. The contact lens loses and then regains water, but the process must eventually come to a steady-state; if it did not, the lens would continually lose or gain water. Once on the eye, tears may be the primary source of continued hydration. The aqueous tear film is composed primarily of water, electrolytes (sodium, chloride, potassium, bicarbonate, magnesium, phosphate, and calcium), serum proteins (albumin, transferrin, IgG, IgM), lacrimal gland proteins (e.g., lysozyme, lactoferrin, betalysin), enzymes (lactate dehydrogenase, pyruvate kinase, malate dehydrogenase, amylase), and metabolites (glucose and urea released by serum). The electrolytic concentration of the tears relates to its osmolality which is approximately 300 to 310 mOsm/liter. Thus, as the lens dehydration process progresses, conductivity will increase due to residual, unevaporated ionic species that remain in the lens.

The depth of dehydration (with respect to the anterior, e.g., outward facing, lens surface) within a contact lens may, for example, range from 30 microns for low water content lenses to 70 microns for higher water content lenses. Commercially available silicone hydrogel lenses may typically have a central thickness of 70-80 microns, which indicates that a significant portion of the lens thickness may be subject to measurable dehydration effects in the bulk lens material. The location of the measurement may therefore be located within or nearly within the dehydration zone of the contact lens, e.g., in the first 30 to 70 microns from the anterior side surface. It should be noted that regardless of the mechanism of contact lens dehydration, the process is likely a cyclical one involving lens drying and rehydration. Once the lens surface has begun to dehydrate (through any or all of the previously mentioned mechanisms), a swelling pressure is created, drawing water from deep within the lens to the surface. High water content materials lose more water before this equilibrium is met than low water content lenses.

In order to measure conductivity within the bulk lens material a single frequency electrochemical impedance measurement may be made. The measurement may be performed using electrochemical impedance spectroscopy (EIS). Electrochemical impedance may be measured across a spectrum of frequencies or at a single pre-selected frequency, and at an alternating current (AC) voltage of constant magnitude, which may desirably be below the threshold for electrolysis (e.g., 100 mVpp) of water. When the impedance is measured at a sufficiently high frequency, greater than 10 kHz for example, the capacitive effect of the Helmholtz double-layer at the electrode surface may be bypassed, and the bulk sample resistance may dominate the signal response akin to a "liquid resistor." This measurement is therefore sensitive to the geometry of the volumetric conductive path between measurement electrodes as well as the conductivity of the bulk material.

EIS measurements may yield a complex value having a magnitude and phase. However, taking the magnitude of the complex measurand may yield an approximate real resistance of the bulk material in ohms. Correlation of these impedance magnitude changes with the position of the measurement electrodes with respect to the anterior side surface may allow for detection of relative bulk conductivity changes and thus bulk hydration changes throughout the day. The magnitude of the impedance may thus be a measure of the bulk conductivity of the lens providing in-situ measurement of the state of hydration of the bulk lens material.

A hydration measuring lens can use this measurement for a variety of subsequent actions. For example, the lens may alert the user that the lens has reached some pre-set hydration threshold and moisturizing drops should be applied. In another example, the lens may alert the user that appropriate levels of lens hydration have been reached during nightly disinfection. In a further example, the hydration signal can be used as input into additional on-board systems to modulate, stabilize, calibrate or otherwise improve their function or accuracy such as electro-optics (e.g., changes to index of refraction) and glucose sensors (local hydration state). Lastly, the hydration level could be used as a means of modulating wear time for sufferers of dry eye and may be implemented as part of a larger therapeutic regimen to minimize deleterious symptoms of prolonged wear combined with dry eye disease. In general, the ability to monitor lens hydration in-situ provides the ability to improve eye health through customized and quantifiable metrics that are indicative of each lens wearers specific habits, physiology and environment; something that is impossible today.

FIG. 1A is a plan view of an ophthalmic device 100 in accordance with an embodiment of the present disclosure. The ophthalmic device 100 may be an on-eye wearable device, and may provide vision and/or medical benefits to a wearer. For example, the ophthalmic device 100 may be a contact lens that provides vision correcting optical power to a user. In some embodiments, the ophthalmic device 100 may also include a dynamic optic that provides accommodation to the user. Additionally and/or alternatively, the ophthalmic device 100 may provide medical testing, such as glucose testing, to a wearer. In either or both examples, the ophthalmic device 100 may include electronics and electrodes for determining a hydration level of the ophthalmic device 100, which may be provided to the user via an external reader, for example.

The illustrated embodiment of the ophthalmic device 100 includes an enclosure 102, control electronics 104, an antenna 106, and a plurality of electrodes 108. The ophthalmic device 100 may be formed to at least fit over a cornea of an eye, and may have a posterior side, e.g., eye-facing side, with a concave shape having a radius of curvature to mate with at least the cornea area of the eye. The ophthalmic device 100 may further have an anterior side, e.g., outward facing side, with a convex shape that also has a characteristic radius of curvature. In some embodiments, the radius of curvature of the anterior side may be different than the radius of curvature of the posterior side. Additionally, the ophthalmic device 100 may be formed into a disc-like shape to cover the cornea and some area surrounding the cornea, and a central area of the ophthalmic device 100 may be referred to as a central optical area. In some embodiments, a diameter of the ophthalmic device 100 may range from 10 to 14 mm, with a central optical area having a diameter that ranges from 4 to 6 mm. The central optical area may be transparent and may provide optical power to some users.

The enclosure 102 may be formed into the disc shape and include outer surfaces on the anterior and posterior sides. The enclosure 102 may be formed from a biocompatible material that allows the ophthalmic device 100 to be worn on a user's eye. For example, the enclosure 102 may be formed from a silicone hydrogel, or other soft, flexible biocompatible polymers. In some embodiments, the enclosure 102 may be formed from two pieces, e.g., an anterior piece and a posterior piece, sealed together (and around the other included components) to form the ophthalmic device 100. Alternatively, the enclosure 102 may be molded around the other included components to form the ophthalmic device 100. Regardless of the process of formation, the enclosure 102, and by extension the ophthalmic device 100, may have a radially-varying thickness that varies from a central axis to an edge. For example, the central optical area may be around 70 to 100 microns in thickness, and the thickness may gradually decrease to an outer perimeter edge.

The control electronics 104 may be disposed, e.g., embedded, in the enclosure 102 and arranged at least outside of the central optical area so not to negatively affect the vision of the wearer. The control electronics 104 may be coupled to the antenna 106, and further coupled to the plurality of electrodes 108 via conductive traces 110. In some embodiments, the control electronics 104 may include functional blocks to perform resistivity measurements, generate an AC voltage at one or more frequencies, communicate via the antenna, and control a dynamic optic (not shown). The dynamic optic may be disposed within the central optical area and may use liquid crystal or electrowetting techniques to form an accommodating optic that provides variable focus to the user.

The antenna 106 may be formed from a conductive trace that forms either a complete loop around the central optical area as shown, or a partial loop (not shown). In some embodiments, the antenna 106 may be used for data communication between the control electronics 104 and an external reader. In some embodiments, the antenna 106 may be used for inductive charging of a power source included in the control electronics 104. In yet other embodiments, the antenna 106 may be used for both data communication and inductive charging, and the two functions may time-share the antenna 106. However, the antenna 106 may alternatively include two separate antennae with one used for data communication and the other used for energy harvesting, e.g., inductive charging.

The illustrated embodiment of the plurality of electrodes 108 includes four electrodes, such as electrodes 108A, 108B, 108C and 108D. Other numbers of electrodes of course can be implemented, however. The plurality of electrodes 108 may be embedded within the enclosure 102 in an area outside of the central optical area so as not to impair the vision of a user. Electrodes 108A and 108B may be arranged in close proximity and disposed on one side of the enclosure 102, whereas electrodes 108C and 108D may be similarly arranged but on a radially opposite side of the enclosure 102.

For example, electrodes 108A, B and electrodes 108C, D may be disposed on a same radius of the enclosure 102, but on radially opposite sides of the enclosure 102. Further, each electrode of the plurality of electrodes may be individually coupled to the control electronics 104 via a conductive trace, e.g., wire, 110. For example, electrodes 108A and 108B may be coupled to the control electronics 104 via a pair of conductive traces 110A, and electrodes 108C and 108D may be coupled to the control electronics 104 via a pair of conductive traces 110B. Although the plurality of electrodes 108 are arranged into two closely arranged pairs, other configurations may be implemented, and/or fewer electrodes may be implemented. For example, an ophthalmic device 100 may be implemented with only two closely spaced electrodes, such as electrodes 108A and 108B, or two electrodes disposed on opposite sides of the central optical area, such as electrodes 108A and 108C.

The plurality of electrodes 108 may be formed from platinum, platinum/iridium alloys, iridium, gold, titanium, or combinations thereof. The electrodes 108 may be formed through deposition of one or more desired metals onto a surface of either a posterior or anterior layer of the enclosure 102, which may be etched using one or more photolithography processes or deposited through one or more shadow masks. Alternatively, a lift-off photolithography process may be performed prior to deposition of the metal(s), then the photoresist may be removed leaving behind the formed electrodes 108. Additionally, the conductive traces 110 may be formed concomitantly with the formation of the plurality of electrodes 108. Further, an exposed area of the electrodes 108 may be relatively small so to limit any potential impact on comfort to the user. For example, the electrodes 108 may have a geometric area from 1 to $1\times10^6$ square microns.

In some embodiments, the control electronics 104, along with the antenna 106, the plurality of electrodes 108, and the conductive traces 110, may be disposed on an annular-shaped substrate that encompasses the central optical area and is embedded within the enclosure 102. Of course, the same components may be embedded within the enclosure 102 without a substrate. In embodiments that include the annular-shaped substrate, the annular-shaped substrate may be formed from a transparent or semi-transparent plastic that may be flexible or semi-rigid to provide structural support for the various electronics and interconnections.

In some embodiments, it may be desirable to have each of the plurality of electrodes 108 individually coupled to the control electronics 104 so that each electrode 108 may be separately and individually provided a voltage, e.g., energized. In some embodiments, the voltage provided to at least two of the electrodes 108, such as electrodes 108A and 108B, may generate a potential difference between the closely spaced pair of electrodes 108. The potential difference may, for example, cause a current to flow between the two electrodes 108 and through the enclosure 102. Based on the voltage between the two electrodes 108 and a measured current, an impedance of the enclosure 102 between the two energized electrodes may be determined. The determined impedance may then be converted into, or indicative of, a level of hydration of the enclosure between the two energized electrodes. Using a small AC voltage at a frequency above 10 kHz, for example, may provide an impedance value having a magnitude and a phase. The phase may be used as an indicator of an optimal measurement frequency, or frequency range, for measurement of bulk resistance. The magnitude may provide an accurate estimate of the bulk resistance of the enclosure 102 between the two electrodes 108.

In some embodiments, the voltage provided to one or more of the plurality of electrodes 108 may be an AC voltage at a desired frequency. For example, an AC voltage having a peak-to-peak voltage level below the electrolysis potential of the liquid in the enclosure 102 may be generated at a frequency between 1 kHz and 1 MHz. In some embodiments, the frequency may be greater than 10 kHz, and the AC voltage may have a peak-to-peak amplitude below 100 mVpp. The AC voltage may cause an AC stimulus signal to form between the electrodes, which may in turn generate an AC response current between the electrodes that flows through the enclosure 102. Then, based on the AC stimulus signal and the AC response current, the control electronics 104 may determine an impedance of the intervening enclosure material and a corresponding hydration level.

Resistivity measurements, and determination of the hydration level, may be made between various pairs of the plurality of electrodes 108. For example, and as shown in FIG. 1B, a local resistivity measurement may be made between electrodes 108A and 108B to determine a local hydration level of the enclosure 102. The control electronics 104 may establish a potential difference between electrodes 108A and 108B that may generate a local current between the same, leading to a localized current and a localized hydration level determination. A similar local hydration level may be made between the electrodes 108C and 108D.

Alternatively or additionally, a global resistivity measurement may be made between electrodes or electrode pairs on opposite sides of the enclosure 102, as is shown in FIG. 1C. For example, a potential difference may be established between one of the pair of electrodes 108A and 108B and one of the other pair of electrodes 108C and 108D. Alternatively, both electrodes of each pair may be used in concert to establish the potential difference between the pairs of electrodes in tandem. For example, both electrodes 108A and 108B may be driven to a first potential while electrodes 108C and 108D may be driven to a second potential such that a current is generated between the two pairs of electrodes. A global current may be generated leading to a global resistivity measurement. The global resistivity measurement may then be the basis of a global hydration level of the ophthalmic device 100.

The local and global resistivity measurements may be performed throughout the life of the ophthalmic device 100. In some embodiments, the measurements may be performed periodically, such as every 15 minutes, with the resulting hydration level communicated to an external reader. In some embodiments, if the hydration level falls below a preset threshold, the user may be informed to address the approaching dryness. For example, the user may apply eye drops to increase the hydration of the eye and the ophthalmic device 100, or the user may remove the ophthalmic device 100 and store it in a hydration solution until the hydration level has reached a desired level. Other responses may include, alerting the user that appropriate levels of hydration have been reached during nightly disinfection. Lastly, the hydration level could be used as a means of modulating wear time for sufferers of dry eye and may be implemented as part of a larger therapeutic regimen to minimize deleterious symptoms of prolonged wear combined with dry eye disease.

FIG. 1B is a cross-sectional view of a portion of the ophthalmic device 100 in accordance with an embodiment of the present disclosure. The cross-sectional view of FIG. 1B shows the physical relationship of the electrodes 108A and 108B to each other and to the anterior and posterior sides of the enclosure 102. Additionally, potential current paths are depicted between the two electrodes 108A and 108B. Other aspects of the ophthalmic device 100 have not been included in 108B so as not to obscure the electrodes.

The electrodes 108A and 108B may be arranged coplanar and may have a similar distance to the anterior surface 114 of the enclosure 102. It should be noted that FIG. 1B, and all Figures, are not to scale. The electrodes 108A and 108B may be disposed within the enclosure 102 so that they are at a depth that will become dehydrated upon when worn by a user. Having the electrodes 108A and 108B in the "dehydration zone" may ensure that the current path between the two electrodes provides a hydration measurement when such a measurement is performed. Additionally, the current generated between the two electrodes 108 may preferentially flow through the less hydrated volume of the enclosure 102 due to the dehydrated volume having lower resistivity than the hydrated. As such, the resistivity measurements and resulting hydration levels may be attributable to the dehydration zone of the enclosure 102.

FIG. 1C is a cross-sectional view of the ophthalmic device 100 in accordance with an embodiment of the present disclosure. The cross-sectional view of FIG. 1C shows the physical relationship of the plurality of electrodes 108 to each other and to the anterior and posterior sides of the enclosure 102. Additionally, potential current paths are depicted between the two pairs of electrodes 108A, 108B and 108C, 108D. Other aspects of the ophthalmic device 100 have not been included so as not to obscure the electrodes.

A distance of the various electrodes 108 from an anterior surface 114 of the enclosure 102 may be different for each of the plurality of electrodes 108. For example, electrode 108A may be at a depth of 20 microns from the anterior surface of the enclosure 102, whereas electrode 108D may be at a depth of 50 microns from the same surface. In general, the electrodes may be placed at a depth ranging from 20% to 80% of the thickness of the enclosure 102.

Figure 2:
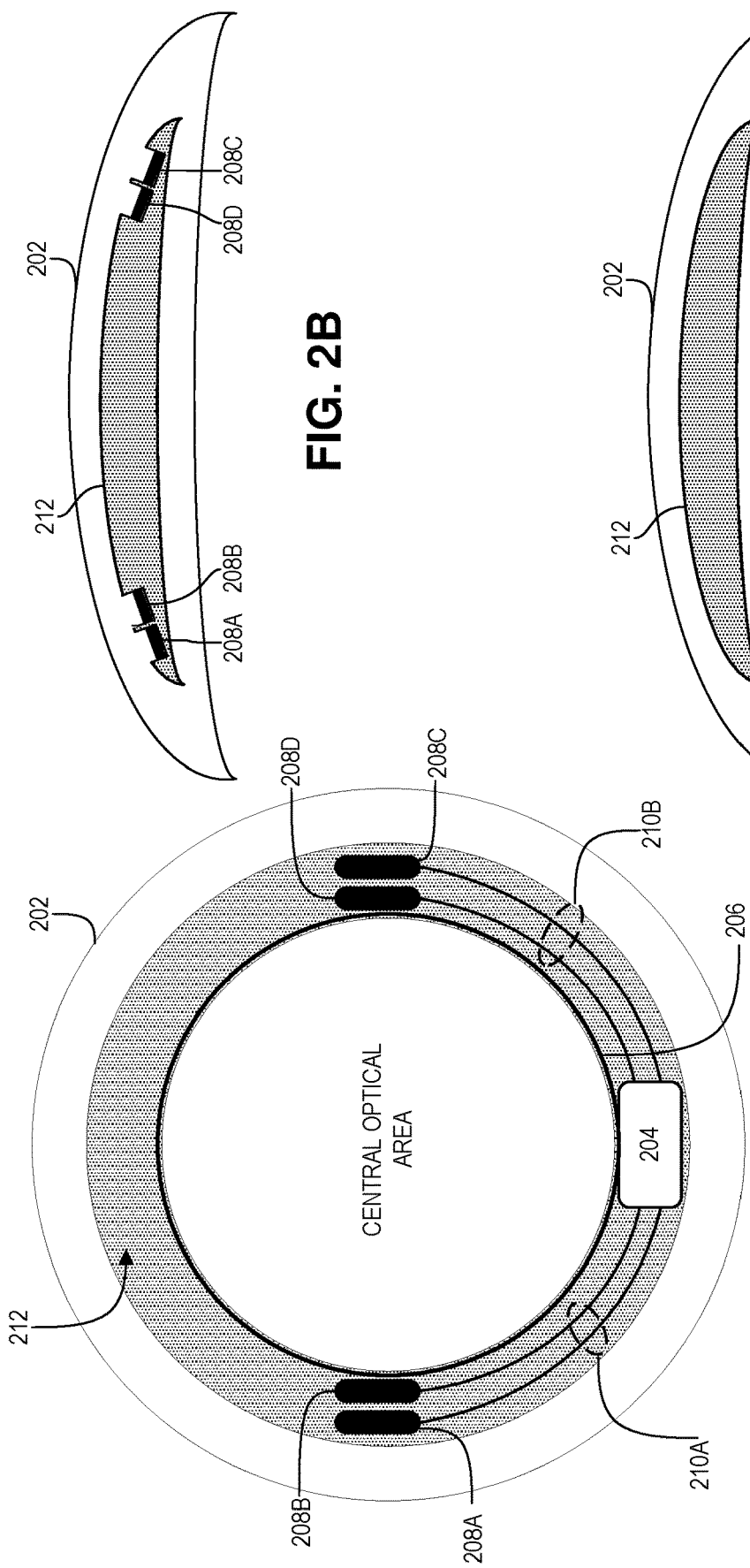
FIG. 2A is a plan view of an ophthalmic device 200 in accordance with an embodiment of the disclosure.
FIG. 2B is a cross-sectional view of an ophthalmic device 205 in accordance with an embodiment of the disclosure.
FIG. 2C is a cross-section view of an ophthalmic device 215 in accordance with an embodiment of the disclosure.

FIG. 2A is a plan view of an ophthalmic device 200 in accordance with an embodiment of the present disclosure. The ophthalmic device 200 may be an on-eye worn device, and may provide vision correcting optical power and accommodation to a user. The ophthalmic device 200 may be an example of the ophthalmic device 100. Several features of the ophthalmic device 200 may be analogous or similar to like features of the ophthalmic device 100, and accordingly, such features may not be discussed in detail with respect to FIG. 2 for sake of brevity. The ophthalmic device 200 may include electronics and electrodes for determining a hydration level of the ophthalmic device 200, which may be provided to the user via an external reader, for example.

The illustrated embodiment of the ophthalmic device 200 includes an enclosure 202, control electronics 204, an antenna 206, a plurality of electrodes 208, and an insert 212. The ophthalmic device 200 may have a shape similar to the ophthalmic device 100, such as being disc-shaped with a convex anterior side and a concave posterior side. The enclosure 202 may be formed from a soft, biocompatible polymer, such as a silicone hydrogel, and encloses the various other features of the ophthalmic device 200.

The insert 212 may be a disc-shaped insert that provides support for the control electronics 204, the antenna 206, and the plurality of electrodes 208. The insert 212 may be formed from a rigid or semi-rigid material. For example, the insert 212 may be formed from PMMA, rigid or semi-rigid gas permeable polymer, or rigid silicone. In some embodiments, the insert 212 may be formed from several separate rigid or semi-rigid layers with at least one of the several layers being formed into an annular-shaped substrate. The insert 212 may have a diameter that at least covers a cornea of a user's eye, but may be less than a diameter of the enclosure 202. For example, the enclosure 204 may have a diameter of 10 to 14 mm, whereas the insert 212 may have a diameter of 6 to 8 mm. Additionally, due to a thickness (in reference to the optical direction) of the insert 212, an overall thickness of the ophthalmic device 200 may be greater than an overall thickness of the ophthalmic device 100. However, there may be around 50 microns of enclosure 204 on an anterior side of the insert 212.

In some embodiments, the insert 212 may include a dynamic optic that spans the central optical area. The dynamic optic may be formed from one or more liquid crystal-type cells that provide accommodation through manipulation of the index of refraction of the one or more liquid crystal-type cells in response to an applied voltage. Alternatively, the dynamic optic may be formed from an electrowetting structure that includes two immiscible fluids that provide a deformable refractive lens in response to an applied voltage. Regardless of the type of dynamic optic implemented, the applied voltage, along with various other control signals, may be provided by the control electronics 204.

The control electronics 204 may be disposed on at least part of the insert 212, and may be coupled to the antenna 206 and the plurality of electrodes 208. In some embodiments, the control electronics may be disposed on an annular-shaped substrate that is included in the insert 212. The antenna 206 may also be disposed on the insert 212, and may be used for communication and/or energy harvesting. The control electronics 204 may be coupled to the plurality of electrodes via a plurality of conductive traces 210, such as a pair of conductive traces 210A and a pair of conductive traces 210B. The plurality of conductive traces 210 may electrically couple the individual electrodes 208 to the control electronics 204 so that each electrode can be individually energized with a voltage and/or current.

The control electronics 204 may include various functional blocks for controlling the operation of the ophthalmic device 200. For example, the control electronics 204 may have control logic to control a dynamic optic, a power supply with charging circuitry, communication components for wireless communication, and control logic for driving and monitoring the plurality of electrodes 208. In some embodiments, the control electronics 204 may be formed in one integrated circuit mounted to a substrate. In other embodiments, the control electronics 204 may be formed from a plurality of integrated circuits mounted to one or more substrates.

The plurality of electrodes 208 may be exposed to the enclosure 202 to perform hydration determining operations. In some embodiments, the plurality of electrodes 208 may be disposed on or in the insert 212 (see FIG. 2B). In other embodiments, the plurality of electrodes 208 may be imbedded in the enclosure 202 outside a perimeter of the insert 212, but electrically coupled to the control electronics 204 (see FIG. 2C). The plurality of electrodes 208 may be formed from one or more conductive metals deposited on a surface of the insert 212, or in the enclosure 202. For example, the plurality of electrodes 208 may be formed from platinum, platinum/iridium alloys, iridium, gold, titanium, or combinations thereof. Each of the plurality of electrodes 208 may have a surface area in contact with the enclosure 202 such to generate a current between the electrodes. The geometric area of the electrodes 208 may be from 1 to $1 \times 10^6$ square microns, for example.

Similar to the ophthalmic device 100, voltages provided to two or more of the plurality of electrodes 208 may be used to establish a potential difference between the two or more electrodes 208 in order to perform hydration level measurements. For example, establishing a potential difference between two electrodes 208 may generate a current between the electrodes and through the intervening enclosure 202. In some embodiments, an AC voltage may be applied to the two or more electrodes 208 at a pre-selected frequency. The generated AC response current may be combined with the AC voltage to determine an impedance value, which may be calculated by the control electronics 204. Using an AC voltage above 10 kHz, for example, may reduce or eliminate the capacitive effect of the Helmholtz double-layer formed at the surface of electrodes 208. As such, a magnitude of the determined impedance may provide an indication of the resistance of the enclosure 202, at least between the two or more electrodes 208. The resistance may then be converted to a hydration level of the ophthalmic device 200.

In some embodiments, a local impedance measurement may be made between two adjacently arranged electrodes, such as electrodes 208A and 208B, to determine a local hydration level of the enclosure 202. For example, control electronics 204 may establish a potential difference between electrodes 208A and 208B by driving each with a different voltage. The potential difference may generate a local current between the two electrodes, leading to a localized current and a localized hydration level determination. A similar local hydration level may be made between the electrodes 208C and 208D.

Alternatively or additionally, a global resistivity measurement may be made between electrodes or electrode pairs on opposite sides of the enclosure 202. For example, a potential difference may be established between one of the pair of electrodes 208A and 208B and one of the other pair of electrodes 208C and 208D. Alternatively, both electrodes of each pair may be used in concert to establish the potential difference between the pairs of electrodes in tandem. For example, both electrodes 208A and 208B may be driven to a first potential while electrodes 208C and 208D may be driven to a second potential such that a current is generated between the two pairs of electrodes. A global current through the enclosure 204 may be generated leading to a global resistivity measurement to determine a global hydration level of enclosure 202. The global current may also occur through some of the insert 212, but may depend on a hydration level of the insert 212. Because the insert 212 and the enclosure 202 may be formed from different materials with different base hydration levels, the insert 212 may not lose as much moisture as the enclosure 202. As such, most of the global current may propagate through the enclosure 202. The global resistivity measurement may then be the basis of a global hydration level of the ophthalmic device 200.

In response to the hydration measurements, various responses may be performed by the ophthalmic device 200. For example, the ophthalmic device 200 may alert the user that a pre-set hydration threshold has been reached and moisturizing drops should be applied. In another example, the ophthalmic device 200 may alert the user that appropriate levels of hydration have been reached during nightly disinfection. In a further example, the hydration signal can be used as input into additional on-board systems to modulate, stabilize, calibrate or otherwise improve their function or accuracy such as electro-optics (e.g., changes to index of refraction) and glucose sensors (local hydration state). Lastly, the hydration level could be used as a means of modulating wear time for sufferers of dry eye and may be implemented as part of a larger therapeutic regimen to minimize deleterious symptoms of prolonged wear combined with dry eye disease.

FIG. 2B is a cross-sectional view of an ophthalmic device 205 in accordance with an embodiment of the present disclosure. The ophthalmic device 205 may be one implementation of the ophthalmic device 200 with the plurality of electrodes 208 imbedded into the insert 212. Although the electrodes 208 may be embedded in the insert 212, the electrodes 208 may still be exposed to the enclosure 202 so that hydration monitoring may be performed. Although the electrodes 208 are shown to be disposed at a bottom of a trench formed in the insert 212, other implementations are contemplated, such as disposing the electrodes 208 on an anterior side surface of the insert 212.

FIG. 2C is a cross-section view of an ophthalmic device 215 in accordance with an embodiment of the present disclosure. The ophthalmic device 215 may be one example of the ophthalmic device 200. The illustrated embodiment of the ophthalmic device 215 includes the enclosure 202, the insert 214, and the plurality of electrodes 208. However, in the ophthalmic device 215, the plurality of electrodes is disposed within the enclosure 202 at a radius outside of the perimeter of the insert 212. The electrodes are at least electrically coupled to the control electronics disposed on the insert 212. In some embodiments, the electrodes 208 may be physically, e.g., mechanically, tethered to the insert 212 as well.

Figure 3:
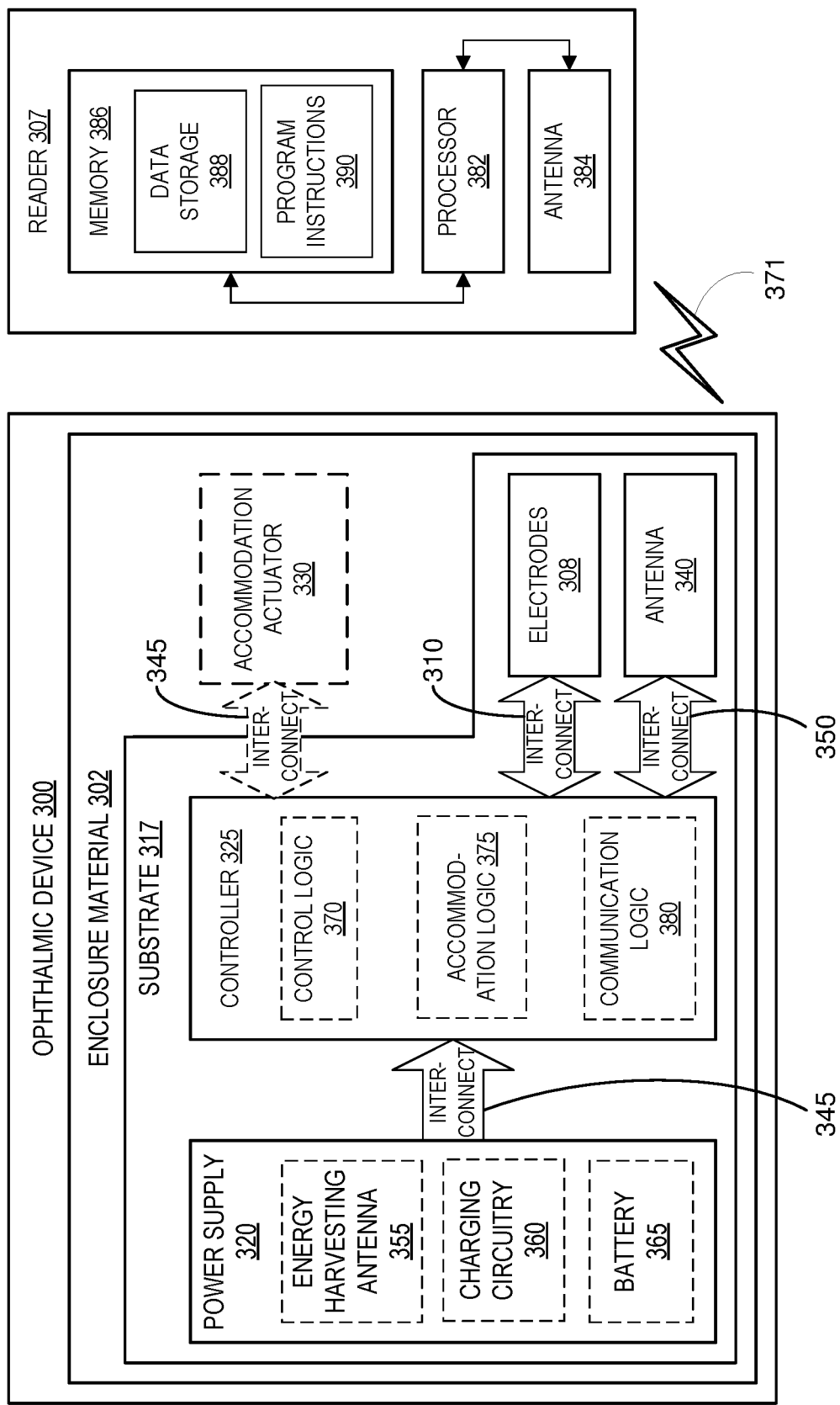
FIG. 3 is a functional block diagram of an ophthalmic device 300 in accordance with an embodiment of the disclosure.

FIG. 3 is a functional block diagram of an ophthalmic device 300 in accordance with an embodiment of the present disclosure. Ophthalmic device 300 may be an on-eye device, such as a contact lens or a smart contact lens and may be an example of the ophthalmic devices 100, 200, 205 and/or 215. In the depicted embodiment, ophthalmic device 300 includes an enclosure material 320 formed to be contact-mounted to a corneal surface of an eye. A substrate 317 is embedded within or surrounded by enclosure material 310 to provide a mounting surface for a power supply 320, a controller 325, an antenna 340, and various interconnects 310, 345 and 350. The substrate 317 and the associated electronics may be one implementation of the control electronics 104 and/or 204 and an associated substrate. In some embodiments, the substrate 317 may be part of the insert 212. In some embodiments, however, control electronics, interconnects, antenna, and electrodes may be disposed within the enclosure 302 without a substrate. The illustrated embodiment of power supply 320 includes an energy harvesting antenna 355, charging circuitry 360, and a battery 365. The illustrated embodiment of controller 325 includes control logic 370, accommodation logic 375, and communication logic 380. As shown, accommodation actuator 330, e.g., a dynamic optic, is disposed in the enclosure material 302.

Power supply 320 supplies operating voltages to the controller 325 and/or the accommodation actuator 330. Antenna 340 is operated by the controller 325 to communicate information to and/or from ophthalmic device 300. In the illustrated embodiment, antenna 340, controller 325, and power supply 320 are disposed on/in substrate 317, while accommodation actuator 330 is disposed in enclosure material 310 (not in/on substrate 317). However, in other embodiments, the various pieces of circuitry and devices contained in ophthalmic device 300 may be disposed in/on substrate 317 or in enclosure material 302, depending on the specific design of ophthalmic device 300. For example, in one embodiment, accommodation actuator 330 may be disposed on one or more transparent substrates disposed within a central optical area of the ophthalmic device 300.

Substrate 317 includes one or more surfaces suitable for mounting controller 325, power supply 320, and antenna 340. Substrate 317 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or silver nanowire mesh) can be patterned on substrate 317 to form circuitry, electrodes, etc. For example, antenna 340 can be formed by depositing a pattern of gold or another conductive material on substrate 317. Similarly, interconnects 310, 345 and 350 can be formed by depositing suitable patterns of conductive materials on substrate 317. A combination of resists, masks, and deposition techniques can be employed to pattern materials on substrate 315. Substrate 317 can be a relatively rigid material, such as polyethylene terephthalate ("PET") or another material sufficient to structurally support the circuitry and/or electronics within enclosure material 302. Ophthalmic device 300 can alternatively be arranged with a group of unconnected substrates rather than a single substrate 317. For example, controller 325 and power supply 320 can be mounted to one substrate 317, while antenna 340 is mounted to another substrate 317 and the two can be electrically connected via interconnects. Substrate 317 may also be a continuous piece of semiconductor, housing all or some of the aforementioned pieces of device architecture as integrated circuitry.

Substrate 317 can be shaped as a flattened ring with a radial width dimension sufficient to provide a mounting platform for the embedded electronic components. Substrate 317 can have a thickness sufficiently small to allow substrate 317 to be embedded in enclosure material 302 without adversely influencing the profile of ophthalmic device 300. Substrate 317 can have a thickness sufficiently large to provide structural stability suitable for supporting the electronics mounted thereon. For example, substrate 317 can be shaped as a ring with a diameter of about 10 millimeters, a radial width of about 1 millimeter (e.g., an outer radius 1 millimeter larger than an inner radius), and a thickness of about 50 micrometers. In some embodiments, the substrate 317 may encircle at least the central optical area. Substrate 317 can optionally be aligned with the curvature of the eye-mounting surface of ophthalmic device 300 (e.g., convex surface). For example, substrate 317 can be shaped along the surface of an imaginary cone between two circular segments that define an inner radius and an outer radius. In such an example, the surface of substrate 317 along the surface of the imaginary cone defines an inclined surface that is approximately aligned with the curvature of the eye mounting surface at that radius.

In the illustrated embodiment, power supply 320 includes a battery 365 to power the various embedded electronics, including controller 325. Battery 365 may be inductively charged by charging circuitry 360 and energy harvesting antenna 355. In one embodiment, antenna 340 and energy harvesting antenna 355 are independent antennae, which serve their respective functions of energy harvesting and communications. In another embodiment, energy harvesting antenna 355 and antenna 340 are the same physical antenna, such as the antenna 106 and/or 206, that are time shared for their respective functions of inductive charging and wireless communications with reader 307. Additionally or alternatively, power supply 320 may include a solar cell ("photovoltaic cell") to capture energy from incoming ultraviolet, visible, and/or infrared radiation. Furthermore, an inertial power scavenging system can be included to capture energy from ambient vibrations.

Charging circuitry 360 may include a rectifier/regulator to condition the captured energy for charging battery 365 or directly power controller 325 without battery 365. Charging circuitry 360 may also include one or more energy storage devices to mitigate high frequency variations in energy harvesting antenna 355. For example, one or more energy storage devices (e.g., a capacitor, an inductor, etc.) can be connected to function as a low-pass filter.

Controller 325 contains logic to choreograph the operation of the other embedded components. Control logic 370 controls the general operation of ophthalmic device 300, including providing a logical user interface, power control functionality, etc. Additionally, control logic 370 controls the hydration monitoring through control of the AC voltages provided to the various electrodes 108 and/or 208. The control logic 370 may energize the various electrodes 108/208 to perform both local and global hydration monitoring. The energized electrodes may generate a current through the enclosure 302 that may be measured by the control logic 370 and an impedance value determined therefrom. The control logic 370 may subsequently determine a hydration level of the enclosure 302 in response to the impedance value.

Accommodation logic 375 includes logic for receiving signals from sensors monitoring the orientation of the eye, determining the current gaze direction or focal distance of the user, and manipulating accommodation actuator 330 (focal distance of the contact lens) in response to these physical cues. The auto-accommodation can be implemented in real-time based upon feedback from gaze tracking, or permit the user to select specific accommodation regimes (e.g., near-field accommodation for reading, far-field accommodation for regular activities, etc.). Communication logic 380 provides communication protocols for wireless communication with reader 307 via antenna 340. In one embodiment, communication logic 380 provides backscatter communication via antenna 340 when in the presence of an electromagnetic field 371 output from reader 307. In one embodiment, communication logic 380 operates as a smart wireless radio-frequency identification ("RFID") tag that modulates the impedance of antenna 340 for backscatter wireless communications. The various logic modules of controller 325 may be implemented in software/firmware executed on a general purpose microprocessor, in hardware (e.g., application specific integrated circuit), or a combination of both.

Ophthalmic device 300 may include various other embedded electronics and logic modules. For example, a light source or pixel array may be included to provide visible feedback to the user. An accelerometer or gyroscope may be included to provide positional, rotational, directional or acceleration feedback information to controller 325.

The illustrated embodiment also includes reader 307 with a processor 382, an antenna 384, and memory 386. Memory 386 in reader 307 includes data storage 388 and program instructions 390. As shown reader 307 may be disposed outside of ophthalmic device 300, but may be placed in its proximity to charge ophthalmic device 300, send instructions to ophthalmic device 300, and/or extract data from ophthalmic device 300. In one embodiment, reader 307 may resemble a conventional contact lens holder that the user places ophthalmic device 300 in at night to charge, extract data, clean the lens, etc.

External reader 307 includes an antenna 384 (or group of more than one antennae) to send and receive wireless signals 371 to and from ophthalmic device 300. External reader 307 also includes a computing system with a processor 382 in communication with a memory 386. Memory 386 is a non-transitory computer-readable medium that can include, without limitation, magnetic disks, optical disks, organic memory, and/or any other volatile (e.g., RAM) or non-volatile (e.g., ROM) storage system readable by the processor 382. Memory 386 can include a data storage 388 to store indications of data, such as data logs (e.g., user logs), program settings (e.g., to adjust behavior of ophthalmic device 300 and/or external reader 307), etc. Memory 386 can also include program instructions 390 for execution by processor 382 to cause the external reader 307 to perform processes specified by the instructions 390. For example, program instructions 390 can cause external reader 307 to provide a user interface that allows for retrieving information communicated from ophthalmic device 300 or allows transmitting information to ophthalmic device 300 to program or otherwise select operational modes of ophthalmic device 300. External reader 307 can also include one or more hardware components for operating antenna 384 to send and receive wireless signals 371 to and from ophthalmic device 300.

External reader 307 can be a smart phone, digital assistant, or other portable computing device with wireless connectivity sufficient to provide the wireless communication link 371. External reader 307 can also be implemented as an antenna module that can be plugged into a portable computing device, such as in an embodiment where the communication link 371 operates at carrier frequencies not commonly employed in portable computing devices. In some instances, external reader 307 is a special-purpose device configured to be worn relatively near a wearer's eye to allow the wireless communication link 371 to operate with a low power budget. For example, the external reader 307 can be integrated in a piece of jewelry such as a necklace, earing, etc. or integrated in an article of clothing worn near the head, such as a hat, headband, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An ophthalmic device comprising:
   an enclosure having a shape to be worn on an eye;
   an insert disposed within the enclosure, the insert including and encompassing a central optical area of the ophthalmic device;
   control electronics disposed in or on the insert, the control electronics coupled to control operation of the ophthalmic device; and
   a plurality of electrodes disposed within the enclosure and electrically coupled to the control electronics, the plurality of electrodes arranged outside of the central optical area of the ophthalmic device, at least some of the electrodes disposed external to the insert and radially peripheral to the insert, wherein each of the plurality of electrodes is electrically coupled to receive a respective voltage from the control electronics to measure an impedance of a region of the enclosure proximate to the plurality of electrodes, the measured impedance indicative of a hydration level of the region of the enclosure proximate to the plurality of electrodes.

2. The ophthalmic device of claim 1, wherein the plurality of electrodes is arranged in close proximity to one another, and wherein the hydration level is a local hydration level of the enclosure.

3. The ophthalmic device of claim 2, wherein the plurality of electrodes includes two electrodes.

4. The ophthalmic device of claim 1, wherein individual ones of the plurality of electrodes are arranged on radially opposite sides of the enclosure, and wherein the hydration level is a global hydration level of the enclosure.

5. The ophthalmic device of claim 4, wherein the plurality of electrodes includes two electrodes.

6. The ophthalmic device of claim 4, wherein the plurality of electrodes includes four electrodes arranged into two pairs, wherein a first pair of electrodes is disposed on one side of the enclosure and a second pair of electrodes is disposed on an opposite side of the enclosure.

7. The ophthalmic device of claim 1, wherein the plurality of electrodes is embedded in the insert.

8. The ophthalmic device of claim 1, wherein the plurality of electrodes is disposed in the enclosure outside of a perimeter of the insert.

9. The ophthalmic device of claim 1, wherein the respective voltage received by each of the plurality of electrodes establishes an alternating current (AC) voltage stimulus signal between individual electrodes of the plurality of electrodes, and, in response to the potential difference, a corresponding AC response current is generated within the enclosure between the individual electrodes of the plurality of electrodes.

10. The ophthalmic device of claim 9, wherein the control electronics measures the generated AC response current and determines the impedance based on a magnitude and a phase of the AC voltage stimulus signal and the corresponding AC response current.

11. The ophthalmic device of claim 1, wherein the respective voltage is an alternating current (AC) voltage generated at either a preselected frequency or swept over a range of frequencies.

12. The ophthalmic device of claim 11, wherein the AC voltage has a peak-to-peak amplitude below a threshold for electrolysis of water, and wherein the preselected frequency is between the range of frequencies extending from 1 kHz to 1 MHz.

13. The ophthalmic device of claim 1, wherein each of the plurality of electrodes are disposed at a depth from an anterior side of the enclosure that ranges from 20% to 80% of the thickness of the enclosure.

14. An ophthalmic device comprising:
an enclosure formed from a biocompatible material and shaped to fit on an eye of a user when worn;
an insert including a dynamic optic disposed within the enclosure, wherein the dynamic optic is disposed within a central optical area of the enclosure and is encircled by the insert;

control electronics disposed in or on the insert and coupled to control the dynamic optic and provide one or more alternating current (AC) voltages at a frequency;
a plurality of electrodes disposed within the enclosure and electrically coupled to the control electronics,
wherein individual ones of the plurality of electrodes are coupled to receive respective AC voltages from the control electronics, and
wherein the control electronics are coupled to determine a hydration level of a region of the enclosure based on an impedance of the enclosure determined in response to the respective AC voltages.

15. The ophthalmic device of claim 14, wherein the plurality of electrodes includes two electrodes disposed in or on the insert and arranged in close proximity.

16. The ophthalmic device of claim 15, wherein the respective AC voltages on the two electrodes generates a corresponding AC response current through at least a portion of the enclosure proximate to the two electrodes, wherein the control electronics are coupled to measure the corresponding AC response current and determine an impedance of the enclosure in response to the respective AC voltages and the generated AC response current, and wherein the impedance is indicative of the hydration level of the enclosure in an area around the two electrodes.

17. The ophthalmic device of claim 14, wherein the plurality of electrodes includes four electrodes arranged in a first pair and a second pair of electrodes, with the first and second pairs of electrodes disposed on radially opposite sides of the insert.

18. The ophthalmic device of claim 17, wherein the respective AC voltages on the four electrodes establishes an AC voltage stimulus signal between the first and second pairs of electrodes, wherein the AC voltage stimulus signal generates a corresponding AC response current through the enclosure between the first and second pairs of electrodes, wherein the control electronics is coupled to measure the corresponding AC response current and determine an impedance of the enclosure between the first and second pairs of electrodes in response to the respective AC voltages and the generated corresponding AC response current, and wherein the impedance is indicative of the hydration level of the enclosure proximate to the first and second pairs of electrodes.

19. The ophthalmic device of claim 14, wherein the plurality of electrodes is embedded in the insert.

20. The ophthalmic device of claim 14, wherein the plurality of electrodes is tethered to the insert and disposed within the enclosure outside of a perimeter of the insert.

21. The ophthalmic device of claim 14, further comprising an antenna disposed within the enclosure and electrically coupled to the control electronics.

22. The ophthalmic device of claim 14, wherein each of the plurality of electrodes is individually electrically coupled to the control electronics.

23. The ophthalmic device of claim 14, wherein the plurality of electrodes is disposed at a depth from an anterior side of the enclosure that ranges from 20% to 80% of the thickness of the enclosure.

24. An ophthalmic device comprising:
an enclosure formed from a biocompatible material and formed to fit over a cornea of an eye when worn;
an insert disposed in the enclosure, the insert including a central optical area of the ophthalmic device;

a plurality of electrodes disposed within in the enclosure and outside of the central optical area of the ophthalmic device;

a dynamic optic disposed within the central optical area; and control electronics disposed in or on the insert and electrically coupled to the plurality of electrodes and the dynamic optic, the control electronics including logic that when executed causes the control electronics to:

provide an alternating current (AC) voltage to the plurality of electrodes to establish a AC voltage stimulus signal between individual electrodes of the plurality of electrodes;

measure an AC response current generated in the enclosure in response to the AC voltage stimulus signal;

determine an impedance of the enclosure proximate to the plurality of electrodes based on the AC voltage and the measured AC response current; and actuate the dynamic optic to provide accommodation to a user when the ophthalmic device is worn.

25. The ophthalmic device of claim 24, wherein the logic further causes the control electronics to determine a hydration level of the enclosure based on the determined impedance.

26. The ophthalmic device of claim 24, further comprising an antenna disposed within the enclosure and electrically coupled to the control logic, and wherein the logic further causes the control electronics to transmit information indicative of a hydration level of the enclosure based on the determined impedance.

27. The ophthalmic device of claim 24, wherein the plurality of electrodes is disposed on the insert.

28. The ophthalmic device of claim 24, wherein the plurality of electrodes includes four electrodes arranged into two pairs of electrodes.

29. The ophthalmic device of claim 28, wherein the two pairs of electrodes are disposed on radially opposite sides of the central optical area, and wherein the two electrodes in each pair are arranged in close proximity to one another.

* * * * *